Dec. 3, 1957    M. AUPHAN    2,815,462
METHOD OF FORMING A FILM SUPPORTED A SHORT DISTANCE
FROM A SURFACE AND CATHODE-RAY TUBE
INCORPORATING SUCH FILM
Filed May 14, 1954    5 Sheets-Sheet 1

Inventor
Michel Auphan
By: Kenway, Jenney, Witter
& Hildreth
Attys.

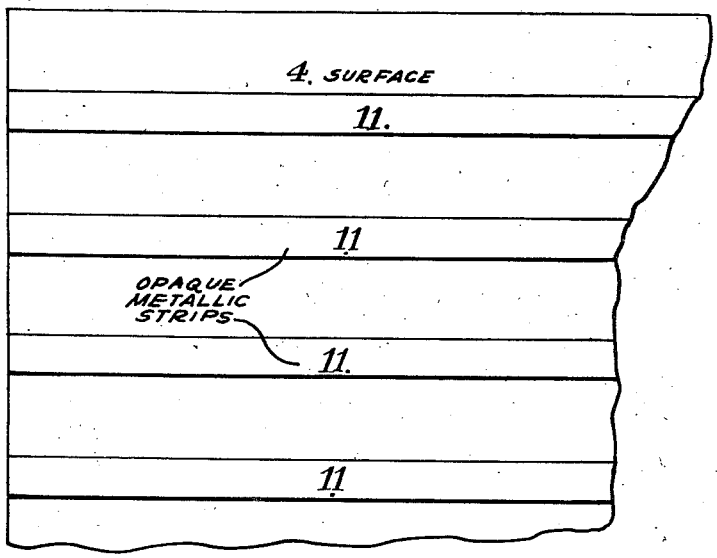
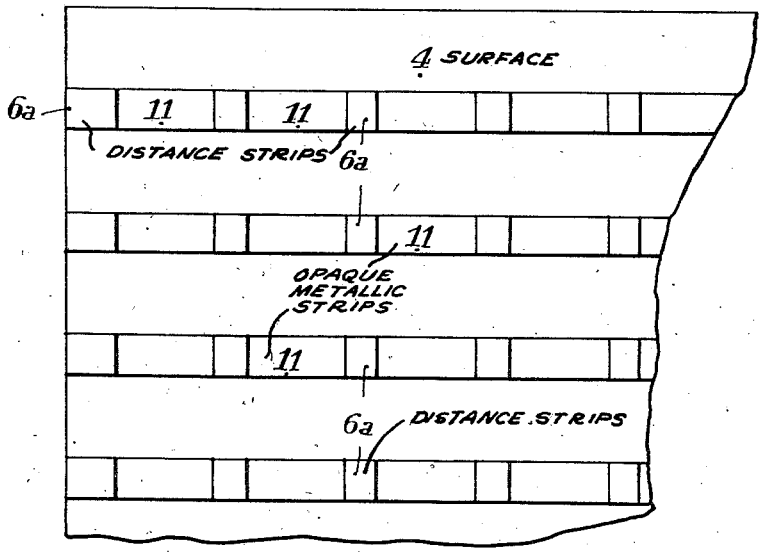

Dec. 3, 1957  M. AUPHAN  2,815,462
METHOD OF FORMING A FILM SUPPORTED A SHORT DISTANCE
FROM A SURFACE AND CATHODE-RAY TUBE
INCORPORATING SUCH FILM
Filed May 14, 1954  5 Sheets-Sheet 3

INVENTOR.
MICHEL AUPHAN

United States Patent Office 2,815,462
Patented Dec. 3, 1957

2,815,462

METHOD OF FORMING A FILM SUPPORTED A SHORT DISTANCE FROM A SURFACE AND CATHODE-RAY TUBE INCORPORATING SUCH FILM

Michel Auphan, Neuilly-sur-Seine, France, assignor to Societe Generale d'Electronique, Societe Anonyme, Monaco-Condamine, Monaco, a corporation of Monaco Application May 14, 1954, Serial No. 429,901

Claims priority, application France May 19, 1953

21 Claims. (Cl. 313—89)

The present invention, due to Mr. Michel Auphan, consists in a method of formation of a film, a metallic film for example, at a short distance from a surface, the film being supported by any number of supports.

The assembly consisting of the wall or surface, the film and its supports, is more particularly intended to form an element of a special type of cathode-ray tube intended for the reception of televised images and to project them by modulation by a light beam, as has been described, for example, in the French Patent No. 994,390 in the name of Mr. Michel Auphan.

The method which is the object of the present invention consists:

In arranging within a chamber provided with means for evaporating substances, a flat surface and a grid in front of the said flat surface, the free spaces between the grid corresponding to the emplacement of the supports with which the surface is to be provided; in creating a vacuum inside the said chamber; in evaporating a first substance of any particular nature, but which should be stable at temperatures lower than about 450° C. so as to cause this substance to be deposited on the surface-grid assembly, this first substance being intended to form the supports for the film; in then evaporating a second substance so as to cause it to deposit on the first substance, this second substance being characterized in that it has no chemical action on the first substance, and also that it is capable of reacting chemically with a third substance, which will be described in more detail later, thereby producing a compound which is stable at temperatures below about 450° C., for example; in removing the grid from in front of the flat surface; in evaporating a third substance so as to cause it to deposit upon the whole of the surface and the supports already coated with the said second substance, this third substance having the characteristic feature that it can be sublimed at a temperature less than about 450° C., for example; in evaporating a last substance or several substances in succession so as to cause them to form a deposit upon the said third substance, the last substance or substances being stable at temperatures less than about 450° C., having no chemical action on the third substance, nor between themselves, and being preferably of a metallic nature; in then removing from the said chamber the surface prepared as described, and in building it into the apparatus in which it is to be used; in producing a vacuum in the said apparatus; in removing by sublimation those deposits of the said third substance which have not been transformed by chemical action with the second substance. This sublimation may be carried out by means of heating in a special oven, or it may result from the heating which is normally carried out during the course of evacuation of the tube with a view to degassing so as to improve the vacuum.

The attached drawings illustrate an example of carrying out the method in accordance with the invention.

Referring to the drawings:

Figs. 7 to 15 show alternative ways of carrying out the process.

Figure 2:
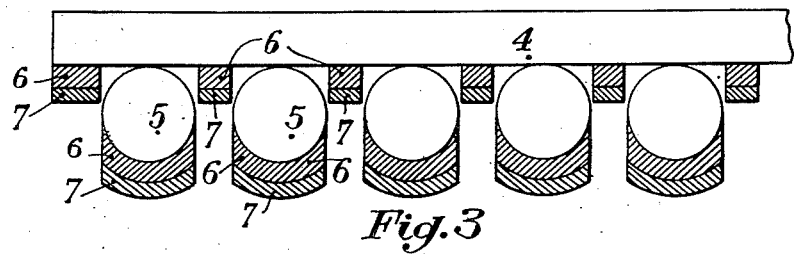
Figs. 2 to 6 are views in cross-section showing the successive stages of the process.

Referring now to Figs. 1 to 6:

The chamber 1 is provided with a sufficient number of evaporating devices 2, and it is equipped with means 3 for producing and maintaining a suitable degree of vacuum in the chamber.

Into this chamber, there is introduced the surface 4 which is to be provided with a film, and the grid 5, arranged in principle in contact with this surface.

The grid, which may be constructed in particular by means of wires, may comprise either a single series of parallel wires or several series of crossed wires. In view of the especially envisaged use of the surface with its film in television receiving apparatus, the diameter of the wires, the spaces between which determine the location at which the supports will be deposited, will preferably be of the order of 13 microns; these values are only given here purely by way of indication, since the method in accordance with the invention may naturally be applied with any form and any method of construction of the grid.

After having obtained an adequate degree of vacuum in the chamber 1, a first substance is evaporated in the chamber in accordance with any appropriate technique, so as to produce on the surface 4 and on the grid 5 a deposit 6 (see Fig. 2), intended to form the supports for the film to be produced. The nature of this substance may be of any kind with the condition that it should be stable at a temperature less than 450° C., which is the temperature in the neighbourhood of which, following the usual practice, the gas is eliminated from a glass tube for use in electronics before it is sealed-off. There may be an advantage in using a metallic body, for example aluminium, so as to make use of its electrical conductivity for the removal of electric charges.

By a similar process, a second deposit 7 is then carried out on the first deposit 6. The substance 7 must not have any chemical reaction with the substance 6, whilst on the other hand, it should react with a third substance which will be described later.

The grid 5 is then removed, either by opening the chamber 1, which will make it necessary to re-create a vacuum in the chamber afterwards, or by a remote control arrangement applied, for example, by means of suitable electro-magnetic devices.

Figure 3:
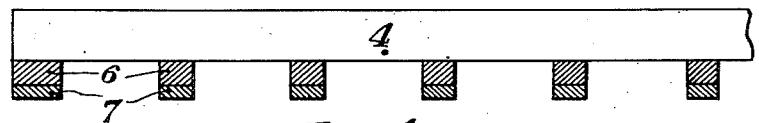
Figure 4:
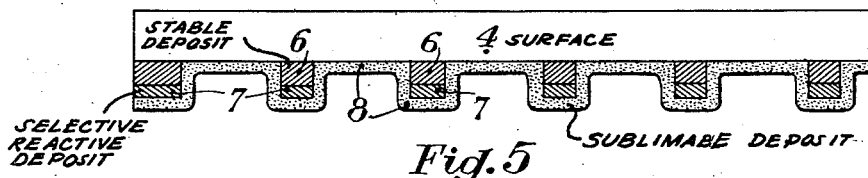
Figure 5:
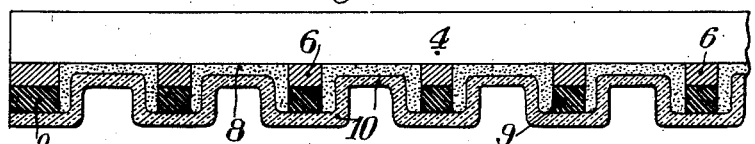

There is obtained in this way a surface 4 provided with supports 6, the latter being coated with the deposit 7 (see Fig. 3).

The evaporation of a third substance is then carried out so as to obtain a deposit 8 (see Fig. 4) which covers at the same time both the surface 4 and the supports. The choice of this third substance is governed by the fact that it should be capable of sublimation at a temperature less than about 450° C., and that it should react chemically with the second substance 7 deposited on the supports 6. This reaction has the effect of substituting a new compound 9 for the combination of the deposits 7 and 8 at all places where these deposits are in contact, that is to say on the supports 6. The substances 7 and 8 are chosen in such a way that this compound is stable at temperatures less than about 450° C.

There is then evaporated a last substance, which is preferably metallic, so as to obtain a deposit 10 (see Fig. 5) covering both the deposit 8 and the compound 9. This deposit 10 constitutes the film with which the surface 1 is to be provided. It may be an advantage to deposit this film in a number of layers which are obtained in that case by means of successive evaporations. One of these layers could constitute, for example, a reflecting layer on one of the faces of the film.

The surface 4 is then removed from the chamber 1 and is built into the apparatus with which it is to operate. This inclusion may consist in using the surface to close a cathode-ray tube which has been prepared for this purpose, the surface wall then constituting the screen of this tube. The joints between the tube and the wall may be effected by any suitable means, for example by welding or by semi-fusion.

A vacuum is then created in the tube and the elimination of the gases which are included in the tube is effected by bringing it up to a temperature of the order of 450° C. This temperature gives rise to the sublimation of the remaining portions of the third substance which constitutes the deposit 8, that is to say solely on the surface 4. This deposit is thus eliminated from the surface so that the film 10 becomes separated from the surface between the supports 6. On the other hand, the compound 9 constituted by the reaction of the deposits 7 and 8 upon the supports 6 is not eliminated.

Figure 6:
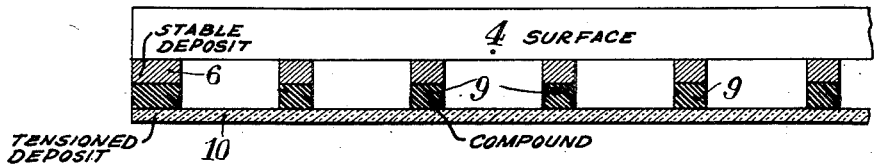
Figure 1:
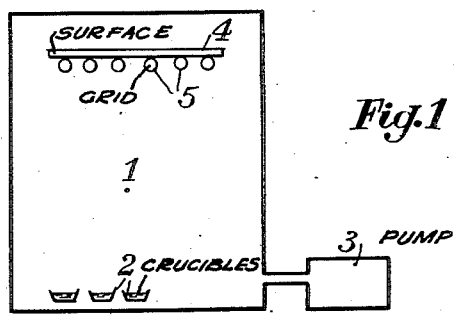
Fig. 1 shows diagrammatically the chamber in which the work is carried out.
Figure 9:
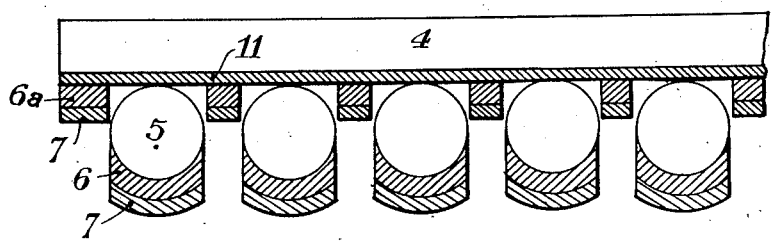

In consequence of the tension existing on the thin layers deposited in the manner described, the film 10 is stretched between the supports and becomes flat (see Fig. 6).

By way of example only and without any restrictive limitation, the following groups may be utilized for the second and third substances: the third substance is a metal, for example cadmium, and the second substance is a metalloid, for example iodine; the third substance is a salt, for example ferric chloride or iodide of mercury, and the second substance is an alkaline or alkaline-earth metal, for example sodium; the third substance is an oxide or an anhydride, for example arsenious anhydride, and the second substance is an oxide or a hydroxide of an alkaline or alkaline-earth metal, for example soda.

For the substance which is intended to form the film 10 beryllium will be preferably employed. The thin layers of this substance have, in fact, the property of taking a substantial mechanical tension when they are deposited, and this property is used in obtaining a perfect plane surface of the film.

In the case of the particular application of the process in accordance with the invention, to the manufacture of television receiving tubes, the total thickness of the deposits 6, 7 and 8 is preferably of the order of 0.6 micron, and that of the film 10 is of the order of 300 Angstrom units. The method described above may be carried out in many alternative ways, all of which fall within the scope of the invention.

In an alternative method which has not been shown, the deposit 6 is not made; the supports are then formed by the combination of the deposits 7 and 8.

In the alternative method shown in Figs. 7, 8 (views in elevation) and 9 (view in cross-section), the final result is slightly different since the film is simply supported by distance pieces joined to each other by opaque strips; this structure has interesting amplications in television. The process is commenced by means of a first grid applied against the surface 4, which in this case is supposed to be made of glass, by effecting by evaporation (see Fig. 7) a deposit on this surface of a series of parallel opaque metallic strips 11; a second grid perpendicular to the first is then placed against the first grid and a deposit (see Fig. 8) is then carried out on each of the strips 11, of a series of uniformly spaced distance strips 6a, which correspond to the support-strips 6 of the preceding figures. The sequence of operations is carried out without any change. The distance strips 6a may be made of the same metal as the opaque strips 11.

Figure 10:
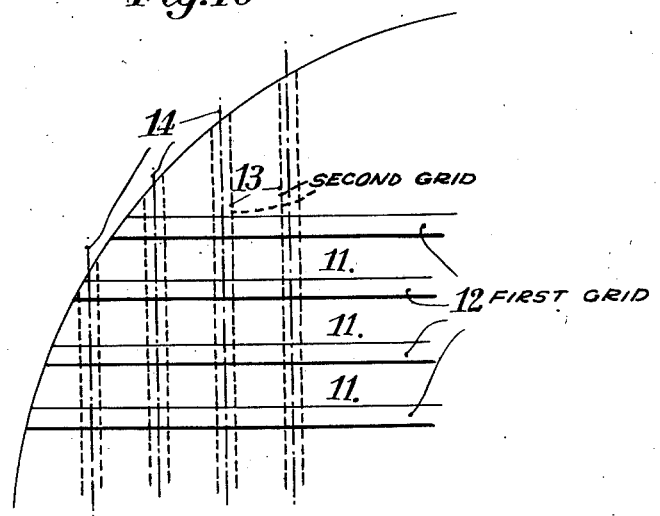
Figure 11:
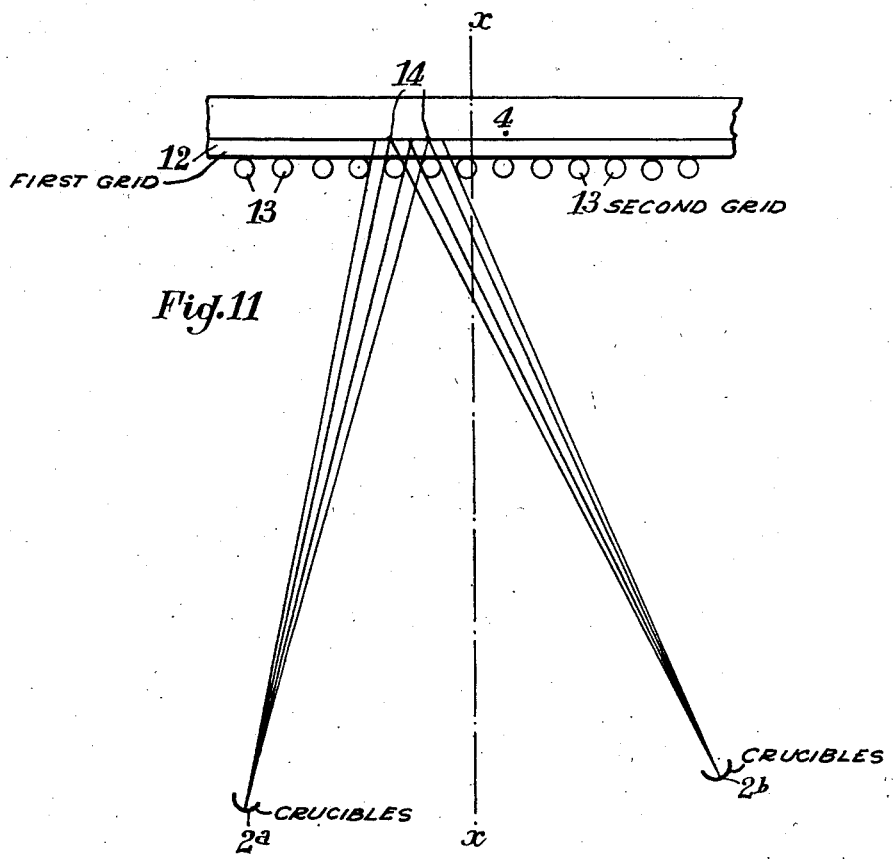
Figure 12:
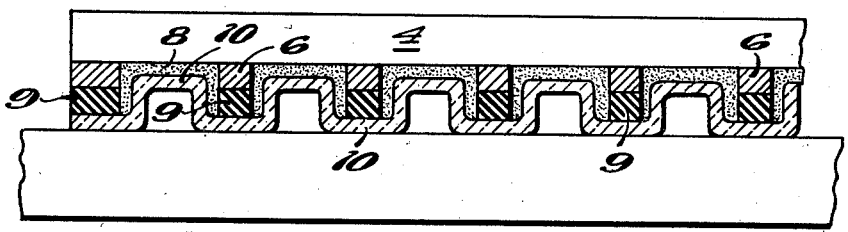
Figure 13:
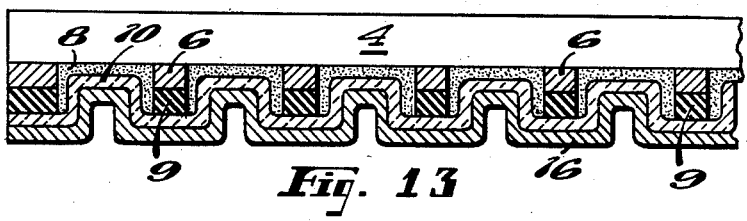
Figure 14:
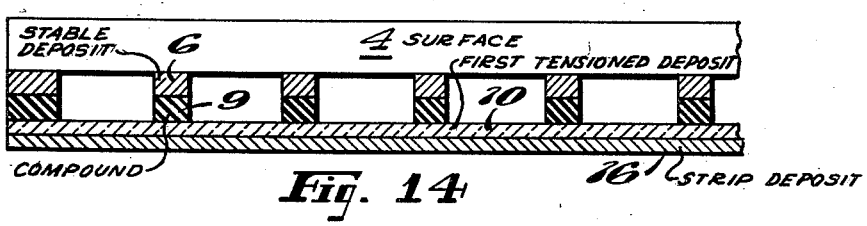
Figure 15:
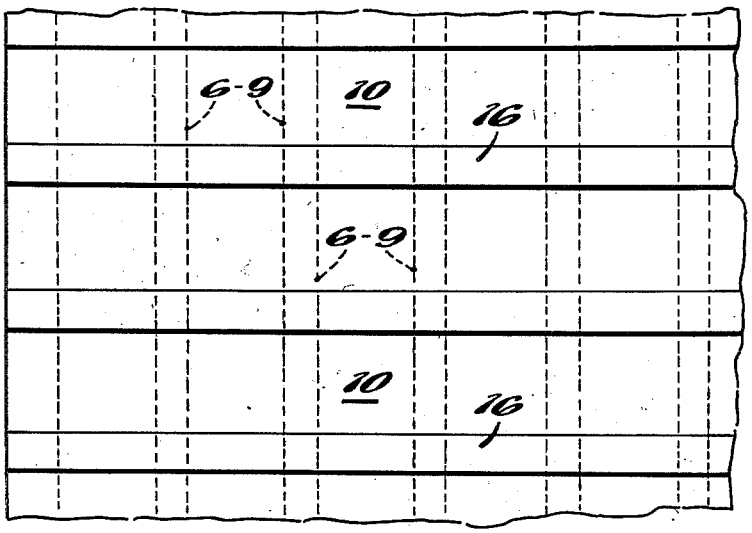

Figs. 10 and 11, which are respectively views in elevation and a view in cross-section to a larger scale, illustrate a further alternative form of the process which enables the same particular result to be obtained as in the case of the preceding method—that is to say the presence of opaque metallic underlying strips 11—but by different means.

In this alternative method, in fact, the two perpendicular grids are not employed successively, but are applied simultaneously to the surface 4, which in this case is supposed to be a glass disc. In Figs. 10 and 11, the wires of the first grid have the reference number 12 and those of the second grid are numbered 13.

In order to form the series of opaque strips 11, evaporation is carried out by means of two crucibles 2a, 2b or a larger number. These crucibles are located in a plane which passes through the axis $x$—$x$ of the disc 4 and parallel to the wires of the grid 12 in contact with the glass; in addition, they are sufficiently separated on each side of the axis for the deposits effected from each of them come into juxtaposition under the wires 13 of the second grid and on the former face of the surface 4 with or without a coating. In the example shown, which comprises two crucibles, it has been supposed that these deposits come together in theory along the lines 14 without overlapping one upon the other.

After the continuous strips 11 have been formed in this way by the double evaporation, the evaporation is continued with a single crucible so as to obtain on these strips the deposit of the distance strips 6a, following which the other successive evaporations are carried out as in the case of the previous examples.

In a further alternative form, the second metallic evaporation by means of which the deposit 7 is formed, is not effected over the whole surface of the wall. This deposit may, for example, be carried out through a grid which is perpendicular to the direction of the first grid 5; in this way there is obtained a series of metallic strips adhering at right angles to a series of further strips. The plate produced in this way may have applications in the field of television.

In a further alternative method, as illustrated in Figures 12 through 15, the metallic evaporation is effected over the whole of the carrying surface, but there is added to it a thicker metallic layer 16 deposited through a perpendicular grid. The film thus formed consists of alternately thin and thick strips. This type of structure is of particular interest to television by light modulation.

In the foregoing description, the expression "stable substance" means that the substance considered is solid and does not suffer any physical or chemical transformation.

It may be of advantage to form the surface 4 into a slightly spherical shape in order to obviate the difficulties due to the possible presence of dust which would adversely affect the tension of the grid when it is placed in position on the surface.

It is to be clearly understood that, in addition to the applications in the field of television to which the invention is especially directed, the process in accordance with the invention may be utilised at all times when it is necessary to form a film carried by supports at a very short distance from a surface.

What I claim is:

1. A method of forming in a vacuum chamber a taut film maintained by a plurality of supports at a very short distance from a surface comprising: masking said surface with a grid, placing said masked surface in said vacuum chamber, evacuating said chamber, evaporating a first substance on said masked surface, said first substance being deposited on said surface and on said masking grid, evaporating a second substance on said first substance, said second substance being incapable of chemical reaction with said first substance, removing said masking grid, evaporating a third sublimable substance on said second substance, said third substance being capable of chemical reaction with said second substance to produce a compound stable at the temperature of sublimation of said third substance, the temperature of sublimation of said third substance being lower than that of said first and second substances, evaporating a fourth metallic substance on said third substance, said fourth metallic substance being incapable of chemical reaction with, and stable at the temperature of sublimation of, said third substance, and heating the entire assembly to eliminate by sublimation that portion of said third substance which has not reacted with said second substance.

2. A method of forming a taut film at a very short distance from one surface of a plate, the film being attached to said surface by a plurality of supports, there being provided an airtight chamber having means for exhausting the air therefrom, and means within said chamber for evaporating substances under low pressure, the said method comprising: arranging in front of said surface within said chamber a grid-like structure composed of parallel equidistant filaments, the spaces between which correspond to the positions of the said supports; evacuating the air from said chamber, at least in part; evaporating a first substance so as to form a deposit on the assembly constituted by said surface and said grid-like structure; evaporating a second substance so as to form a deposit upon that of said first substance, this second substance being chosen to have no chemical reaction with said first substance, but being capable of reacting chemically with a third substance to produce a compound stable at temperatures less than a certain value; removing the grid structure from its position in front of said surface; evaporating said third substance so as to form a further deposit over the whole of said surface and supports coated with said second substance, said third substance having a temperature of sublimation less than that of the other substances and below a certain fixed value; successively evaporating and depositing over said third deposit at least one fourth substance, said substances being of a metallic nature and having no chemical reaction either with said third substance or with each other, and being stable at the temperature of sublimation of said third substance; and finally, eliminating by sublimation those parts of the deposit of said third substance which have not been transformed by chemical action with said second substance.

3. A method as claimed in claim 2, adapted to the manufacture of component parts of cathode-ray tubes, in which the eliminating by sublimation of the remaining deposits of said third substance is effected within the said tube, to which the said plate with its prepared surface has been transferred from said chamber, the said sublimation being carried out after the commencement of the operation of evacuation air from the said tube.

4. A method as claimed in claim 2, in which the said third substance is a metal, and the said second substance is a metalloid.

5. A method as claimed in claim 2, in which the said third substance is cadmium and the said second substance is iodine.

6. A method as claimed in claim 2, in which the said third substance is a salt and the said second substance is an alkaline metal.

7. A method as claimed in claim 2, in which the said third substance is a salt and the said second substance is an alkaline-earth metal.

8. A method as claimed in claim 2, in which the said third substance is mercuric iodide.

9. A method as claimed in claim 2, in which the said third substance is ferric chloride.

10. A method as claimed in claim 2, in which the said second substance is sodium.

11. A method as claimed in claim 2, in which the said second and third substances are both oxides.

12. A method as claimed in claim 2, in which the said third substance is an anhydride.

13. A method as claimed in claim 2, in which the said second substance is a hydroxide of an alkaline metal.

14. A method as claimed in claim 2, in which the substance adapted to constitute the said taut film is beryllium.

15. A method as claimed in claim 2, comprising the following steps subsequent to the evaporation and deposit of said fourth substance: placing a second grid structure in front of said surface, the filaments of said second grid being perpendicular to those of said first grid previously removed; proceeding to a further evaporation of said fourth substance to form a complementary deposit constituting a metallic layer of greater thickness; and finally, removing by sublimation those parts of the deposit of said third substance which have not been transformed by chemical action with said second substance.

16. A cathode-ray tube incorporating a plane-surface screen prepared and constructed in accordance with the method claimed in claim 2.

17. A method of forming a taut film at a very short distance from one surface of a plate, the film being attached to the said surface by a plurality of supports, there being provided an air-tight chamber associated with means for evacuating the air therefrom, and means within said chamber for evaporating substances under low pressure, the said method comprising: arranging in front of said surface within said chamber, a grid-like structure composed of parallel equidistant filaments, the spaces between which correspond to the positions of said supports; evacuating the air from said chamber, at least in part; evaporating a first substance so as to form a deposit on the assembly constituted by said surface and said grid structure, said first substance being so chosen that it is capable of reacting chemically with a second substance to produce a compound stable at temperatures less than a certain value; removing the grid structure from its position in front of the said surface; evaporating said second substance so as to form a deposit over the whole of said surface and the support strips formed by said first deposit, said second substance having a temperature of sublimation less than that of the other substances; successively evaporating and depositing over said second deposit at least one further substance of a metallic nature and having no chemical reaction either with said second substance or between themselves, and being stable at the temperature of sublimation of said second substance; and finally eliminating by sublimation those parts of the deposit of said second substance which have not been transformed by chemical action with said first substance.

18. A method of forming a taut film at a very short distance from one surface of a plate, the film being attached to the said surface by a plurality of supports, there being provided an air-tight chamber associated with means for evacuating the air therefrom, and means within said chamber for evaporating substances under low pressure, the said method comprising: placing in front of said surface within said chamber, a grid-like structure composed of parallel equidistant filaments, the spaces between which correspond to the positions of said supports; evacuating the air from said chamber, at least in part; evaporating a first substance so as to produce a deposit on said surface in the form of parallel opaque strips; placing a second grid-like structure in front of said first-mentioned grid, and with its filaments forming an angle with those of said first grid; evaporating a second substance through said grids so as to form a series of distance-supports on said opaque strips; evaporating a third substance to form a further deposit on the said distance-supports, the said third substance having no chemical reaction with said second substance but being capable of reacting chemically with a fourth substance to produce a compound stable at temperatures less than a certain value; removing the two grid structures from their position in front of the said surface; evaporating the said fourth substance to form a further deposit over the whole of said surface and distance-supports, said fourth substance having a temperature of sublimation less than that of the other substances; evaporating and depositing over said fourth deposit at least one further substance, said last-mentioned substances being of a metallic nature and having no chemical reaction either with said fourth substance or between each other, and being stable at the temperature of sublimation of said fourth substance; and finally, eliminating by sublimation those parts of the deposit of said fourth substance which have not been transformed by chemical action with said third substance.

19. A method as claimed in claim 18, in which the two first substances are both metallic.

20. A method as claimed in claim 18, in which the said distance-supports are formed by cross-deposits of opaque strips made through both said grids employed simultaneously, the corresponding evaporations being effected from two crucibles located at a suitable distance from each other, one on each side of the general axis of the said surface and in a plane parallel to the wires of one of the said grids.

21. A method as claimed in claim 18, in which the second evaporation is adapted to produce a second deposit over a part only of the said surface on which the film is to be formed.

References Cited in the file of this patent
UNITED STATES PATENTS

| | | |
|---|---|---|
| 2,644,208 | Auphan | July 7, 1953 |
| 2,675,339 | Zenftman | Apr. 13, 1954 |
| 2,769,742 | Helbing | Nov. 6, 1956 |